April 10, 1934.  S. KRALL  1,954,483
FLEXURE TESTING DEVICE AND METHOD
Filed May 1, 1930
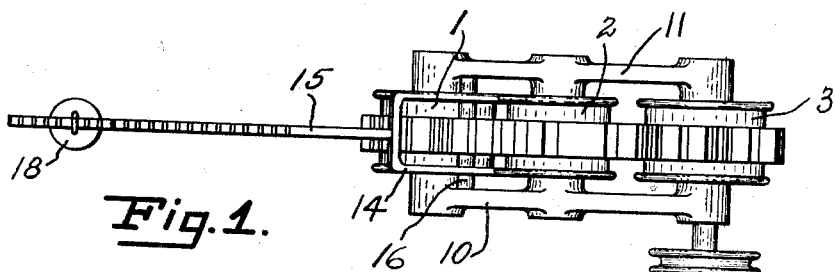
Fig. 1.
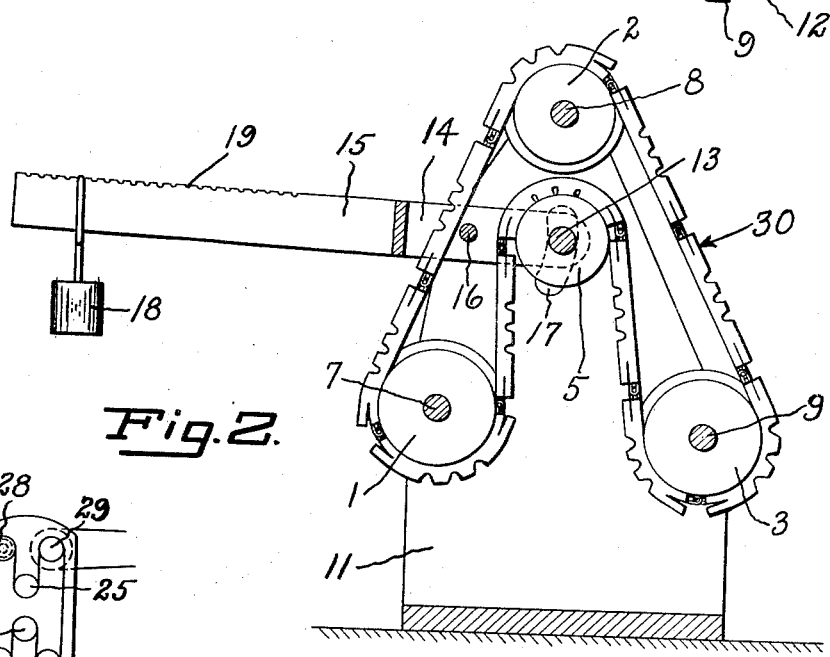
Fig. 2.
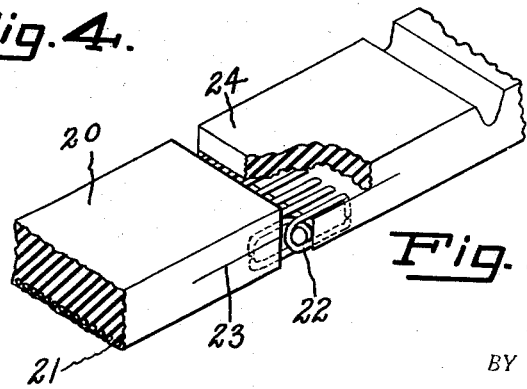
Fig. 4.
Fig. 3.
INVENTOR.
STANLEY KRALL
BY
ATTORNEY Patented Apr. 10, 1934

1,954,483

UNITED STATES PATENT OFFICE 1,954,483

FLEXURE TESTING DEVICE AND METHOD

Stanley Krall, Longmeadow, Mass., assignor to The Fisk Rubber Company, Chicopee Falls, Mass., a corporation of Massachusetts Application May 1, 1930, Serial No. 448,886

5 Claims. (Cl. 73—51)

My invention relates to a device for testing rubber stocks such as are used in the manufacture of pneumatic tire casings.

It has for its object the provision of a method and device which will subject the samples to an accelerated flexing action similar in kind to that sustained in service and at the same time permit a standardization of test conditions making possible a direct comparison of stocks of varying compounding.

In the accompanying drawing which illustrates one embodiment of my invention,

Fig. 1 is a plan view of the device;

Fig. 2 is a side elevation, partly in section;

Fig. 3 is a detail perspective view, with parts broken away, showing the manner of attaching the samples to each other; and Fig. 4 shows an alternative arrangement.

Referring to the drawing, 1, 2 and 3 indicate three pulleys, rotatable in a common plane and arranged in triangular formation. A fourth pulley 5 rotatable in the plane of the others is positioned within the triangular formation. As shown, pulleys 1, 2 and 3 are secured respectively on shafts 7, 8 and 9, which are journaled in side frames 10 and 11. Shaft 9 is extended beyond the side frame and provided with a driving pulley or sprocket 12 by which the pulley 3 is driven by a motor or other means not shown. Shaft 13 of pulley 5 is journaled in arms 14 of a forked lever 15 pivoted as at 16 in side frames 10 and 11, the ends of shaft 13 engaging in slots 17 formed in the side frames to limit the movement of roll 5. A weight 18 is provided on lever 15, adapted to be selectively positioned in any one of a number of notches 19 to vary the effect of the weight.

The specimens 20 to be tested are preferably prepared with a cord backing 21, and are secured together in the form of an endless belt, as indicated at 30, by suitable means such as metal belt laces 22. These laces or other fastening means are preferably applied by slitting the ends of the specimens as at 23, the overlying portion 24 maintaining the uniform thickness of the specimen when it is reversed in passing over pulley 5 as shown in Fig. 2.

In operation the belt is trained over the pulleys, the required degree of tension being supplied by weight 18. As the specimens pass over pulleys 1, 2 and 3 they are successively flexed and straightened and in passing over pulley 5 the direction of flexing is reversed. The sharpness of the bending is governed by the diameter of the pulleys which may be of the same or varying diameters.

Various changes may be made in the arrangement or number of the pulleys without departing from the scope of my invention. For example, in Fig. 4 I have shown an arrangement of six pulleys two of which, 25 and 26, give reverse flexure to the specimens. In the arrangement of Fig. 4 the tensioning mechanism 27 is applied to pulley 28 and pulley 29 is shown as driven.

Having thus described my invention, I claim:

1. A device for testing rubber specimens in the form of an endless belt which comprises a plurality of pulleys around which said belt is adapted to be trained, at least one of said pulleys being positioned to reverse the curvature of said belt with respect to the curvature imparted thereto by the other pulleys, means by which one of said pulleys may be driven, the remaining pulleys being idlers, and means to constantly apply a measured predetermined degree of tension to said belt whereby the specimens of which said belt is formed are subjected to predetermined flexing under predetermined tension upon rotation of the driven pulley.

2. A device for testing rubber specimens in the form of an endless belt which comprises a plurality of pulleys around which said belt is adapted to be trained, said pulleys being of a diameter to impart a predetermined curvature to said belt, at least one of said pulleys being positioned to reverse the curvature of said belt with respect to the curvature imparted thereto by the other pulleys, means by which one of said pulleys may be driven, the other pulleys being idlers, and means to apply a constant measured predetermined degree of tension to said belt whereby the specimens of which said belt is formed are subjected to predetermined flexing under predetermined tension upon rotation of the driven pulley.

3. A device for testing rubber specimens in the form of an endless belt which comprises a combination of pulleys about which said belt is adapted to be trained, said combination including a plurality of pulleys mounted in fixed relation to each other and a pulley mounted for movement with respect to said fixed pulleys, at least one of said pulleys being positioned to reverse the curvature of said belt with respect to the curvature imparted thereto by the other pulleys, means by which one of said pulleys may be driven, the other pulleys being idlers, and means for urging said movable pulley in a direction to apply a constant measured predetermined degree of tension to said belt whereby the specimens of which said belt is formed are subjected to predetermined flexing under predetermined tension upon rotation of the driven pulley.

4. A device for testing rubber specimens in the form of an endless belt which comprises a frame, three rotatable pulleys journaled in said frame in triangular formation and in fixed relation to each other, about which said belt is adapted to be trained, means by which one of said pulleys may be driven, a fourth pulley positioned within the triangular formation and engaging the outside of the belt to reverse the curvature of the latter with respect to the curvature imparted thereto by the other pulleys, a lever pivoted intermediate its ends to said frame, in one end portion of which said fourth pulley is journaled and a weight adjustably mounted on the other end portion of said lever to apply a predetermined measured tension to said belt.

5. The method of testing rubber materials which comprises connecting blocks of the material together to form an endless belt and driving the so formed belt around a train of pulleys, so positioned with respect to each other as to successively flex the blocks in opposite directions in a predetermined sequence, under a predetermined tension.

STANLEY KRALL.